E. M. & J. E. MIX.
Calender Clock.
No. { 129. / 1,233. }
Reissued Oct. 29. 1861.
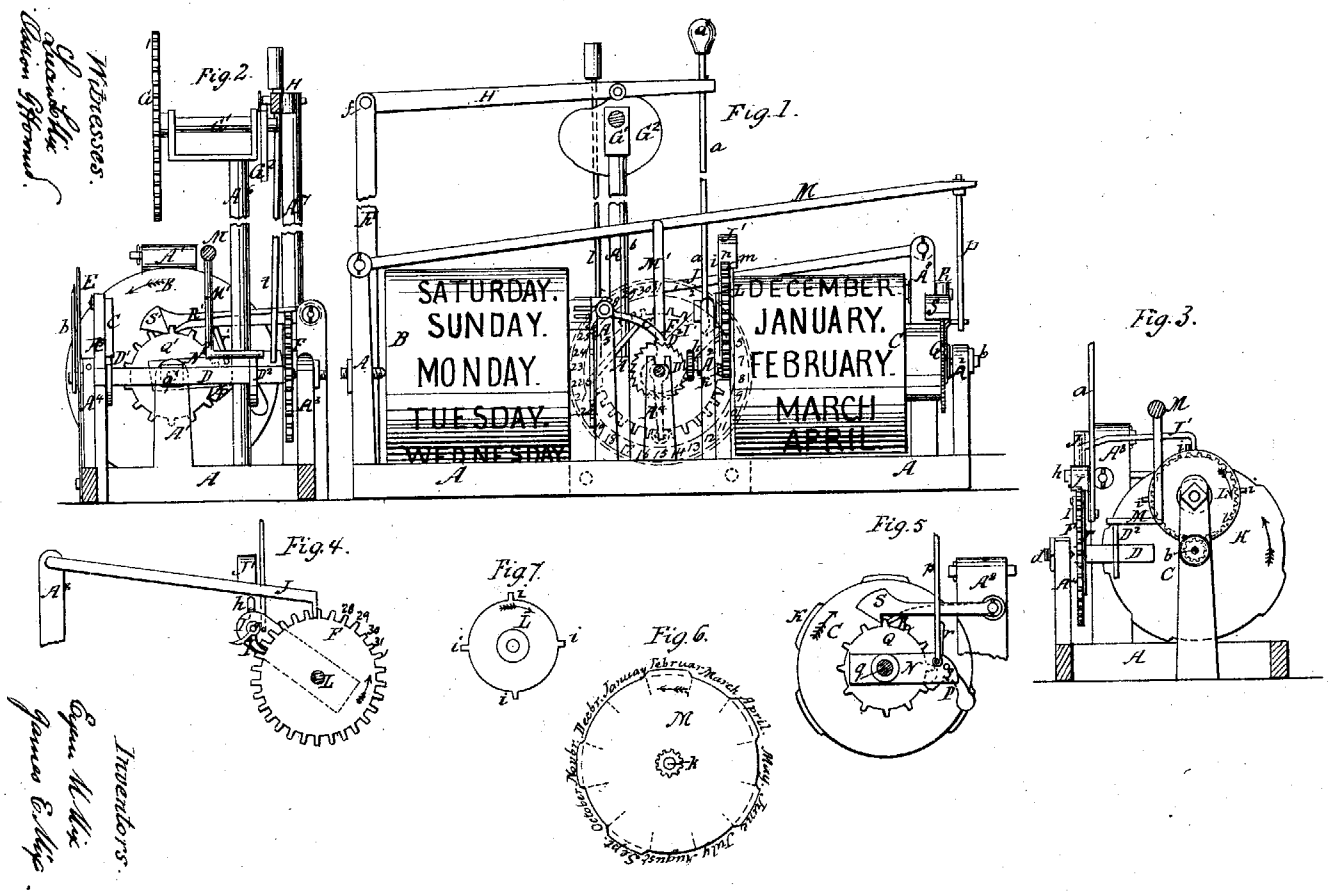
N. PETERS, PHOTO-LITHOGRAPHER, WASHINGTON, D. C.

UNITED STATES PATENT OFFICE.

WAIT T. HUNTINGTON AND HERVEY PLATTS, OF ITHACA, NEW YORK, ASSIGNEES OF E. M. AND J. E. MIX.

IMPROVEMENT IN CALENDAR-CLOCKS.

Specification forming part of Letters Patent No. 27,023, dated January 31, 1860; Reissue No. 1,233, dated October 29, 1861.

*To all whom it may concern:*

Be it known that we, WAIT T. HUNTINGTON and HERVEY PLATTS, both of Ithaca, in the county of Tompkins and State of New York, have had issued to us (as sole assignees of EUGENE M. MIX and JAMES E. MIX, of Ithaca aforesaid) Letters Patent of the United States, bearing date January 31, 1860, for an Improvement in Calendar-Clocks, invented by said EUGENE M. and JAMES E. MIX; and we do hereby declare that the following is a full, clear, and exact description of the same, reference being had to the accompanying drawings, forming part of this specification, in which—

Figure 1 is a front view of a calendar-movement having the said invention applied. Figs. 2 and 3 are transverse vertical sections of the said movement, both taken near the shaft of the "day-of-the-month" index, but one exhibiting the parts on one side of the plane of section and the other the parts on the opposite side. Fig. 4 represents a back view of the "day-of-the-month" roller, and of the mechanism for operating it. Fig. 6 is a side view of the year-wheel, and Fig. 7 is a side view of the leap-year wheel.

Similar letters of reference indicate corresponding parts in the several figures.

This invention consists in certain novel means of governing the movements of the day-of-the-month index at the end of the month of February, which are more simple and less liable to get out of order than the mechanism heretofore used for the purpose, and hence more reliable and certain in their operation.

To enable others skilled in the art to make and use the invention, we will proceed to describe its construction and operation.

A is a frame furnished with posts $A'$ $A'$ $A^2$ $A^2$ $A^3$ $A^4$ $A^5$ $A^6$ $A^7$ $A^8$ $A^9$ to support the several parts of the calendar-movement, said frame being intended to be arranged below the clock-movement. B is the day-of-the-week roller, having the names of the days inscribed upon its periphery; and C is the month-roller, having the names of the months inscribed on its periphery. These rollers are represented arranged end to end, but at some distance apart, between center screws screwing into the posts $A'$ $A'$ $A^2$ $A^2$. D is the arbor which carries the index *b*, pointing to the numbers 1 to 31, marked at equal distances apart in a circle inscribed on the dial E. This index and dial are omitted in Fig. 1 to expose the working parts behind it, but the index and circle of figures are represented in that figure in red color. The said arbor D is arranged between the rollers B and C, with its axis at right angles to their axes, and supported partly by a set-screw, *d*, in the post $A^3$ and partly in a bearing in the post $A^4$; and it has secured to it the day-of-the-month wheel F, (best shown in Fig. 4,) which has its circumference divided into thirty-one (31) teeth, of which twenty-eight (28) are of uniform depth or projection. The twenty-ninth projects not so much, the thirtieth still less, and the thirty-first least of all, as shown in the last-mentioned figure. The said arbor D is also furnished with a ratchet-wheel, $D'$, of thirty-one (31) teeth, and with a snail-cam, $D^2$, the latter for actuating the mechanism by which the movement of the month-roller C is effected, and the former having applied to it a pawl, *c*, Figs. 1 and 2, for preventing the day-of-the-month wheel F and index *b* from turning the wrong way, the said pawl being attached to the post $A^5$, and having a hook, *c'*, attached to it to catch against the said post in case of its being subject to any tendency to lift it too high. G (Fig. 2) is the twenty-four-hour wheel, geared with the clock-movement in such a manner as to be caused to rotate once in twenty-four hours. The arbor $G'$, Figs. 1 and 2, of this wheel is supported in bearings in the top of the post $A^6$, and it carries the cam $G^2$, from which all the working parts of the calendar mechanism derive motion. This cam, once during every one of its diurnal revolutions, raises slowly and lets fall quickly a lever, H, which works on a fixed fulcrum, *f*, in the post $A^7$, and it is by the quick descent of this lever, which should always take place at midnight, that the movements of the several parts are effected.

The day-of-the-month wheel F derives motion at the end of every day from a click, I, (best shown in Fig. 4,) that is suspended by a pin, *g*, from a lever, $I'$, that is fitted to oscillate freely upon the arbor D. The said click, when it is moved upward with the said lever, passes freely over the teeth of the wheel F, but when it is moved downward engages between the teeth and turns the wheel. The lever H is made to operate this lever I′ by means of a rod, *a*, which is connected with the latter lever, but which passes up through a hole in the former one, and is furnished with a knob, *a′*, above. The lever H, in its upward movement, coming into contact with the knob *a′*, raises the said rod, and with it the lever and pawl, and in its downward movement it allows the lever I′ and its pawl I and the rod *a* to drop by their own weight, which is sufficient to make the click I turn the wheel F as far as permitted by a detent, J, which is attached to the post $A^8$, said detent being raised from between the teeth of the said wheel to permit the necessary movements thereof by a projection, *h*, on the lever I′, coming into contact with it as the said lever rises, and being allowed to drop again with the said lever as the latter descends. The wheel F is only moved farther than the distance of a single tooth, at the termination of the last day of each of the months of less than thirty-one days, when it has to be moved the distance of two, three, or four teeth, according as the month has thirty, twenty-nine, or twenty-eight days; and such further movement is governed by the year-wheel K, the leap-year wheel L, the three shorter teeth of the wheel F, and an arm, J′, rigidly attached to the detent J. The year-wheel K is made of a thin plate of brass or other metal and secured to one end of the month-roller C, the circle of the said wheel being divided into twelve equal parts, representing the months, as shown in Fig. 6, and the divisions representing the seven months of thirty-one days being made to present themselves less prominently in the circumference of the wheel than those representing the shorter months, but all the latter, including that representing the month of February, being equally prominent. This wheel, rotating with the month-roller, makes one-twelfth part of a revolution at the end of every month, and therefore completes its revolution every year. The leap-year wheel L, which is best shown in Fig. 7, has four teeth arranged at equal distances apart—viz., three, *i i i*, of equal length, and one, *i**, which is shorter. It is arranged above the axis of and close to the side of the year-wheel K, on a fixed stud, *j*, secured in the post $A^9$, and has secured to it a spur-gear, *l*, which gears with a spur-gear, *k*, that is secured to the-year wheel, the gear *l* having four times the number of teeth that *k* has, so that the leap-year wheel L makes precisely one revolution while the year-wheel K makes four. The arrangement of the gearing is also such that when the division of the year-wheel K, representing the month of February, comes to the top of the teeth *i i i i** of the leap-year wheel is presented directly over the center of that wheel, the short tooth *i** being presented during February of leap-year. The extremity of the arm J′ of the detent J is turned downward, and is situated directly over the year-wheel and leap-year wheel, and is provided with a step-formed face, *m n*, the part *m* of which is situated over the year-wheel, and the part *n* over the leap-year wheel; and the said wheels constitute stops to the said arm J′, and thereby regulate the depth to which the detent enters between the teeth of the day-of-the-month wheel F, when it falls to arrest the movement of that wheel. When one of the less prominent divisions of the year-wheel representing a month of thirty-one days is presented upward, the detent is allowed to drop down as low as the bottoms of the teeth of the wheel F, and hence it will prevent the said wheel moving more than one tooth at a time, and the thirty-one days will be indicated by the index *b*. When, however, one of the more prominent divisions representing a month of thirty days is presented, the arm J′ is stopped by the wheel K in a higher position, and the detent prevented dropping so deeply into the wheel F as to stop the shortest tooth marked 31 in Fig. 4, and representing the thirty-first days of the month, and hence, though the twenty-ninth and thirtieth teeth are stopped after the movements of the wheel, which take place at the end of the twenty-eighth and twenty-ninth days, the thirty-first tooth is allowed to pass the detent and the wheel goes on till the first tooth (marked 1 in Fig. 4) arrives at the detent and the index *b* arrives at 1 (one) on the dial E. During the month of February, in other years than leap-year, one of the longer teeth, *i*, of the leap-year wheel L is presented under the arm J′, and the said arm is arrested by the said tooth in such a position that the detent will stop none but the full length teeth of the wheel F, and hence in the movement of the said wheel which takes places at the end of the twenty-eighth day, all three of the shorter teeth pass the detent and the said wheel is not stopped till the tooth 1 arrives at the detent; but in February of leap-year the shorter tooth, *i**, of the wheel L is presented to the arm and the detent allowed to fall so much lower that though it will not stop the thirtieth tooth it will stop the twenty-ninth.

The month-roller C and the year-wheel K, which, it will be recollected, is attached to that roller, derive motion to the extent of one-twelfth of a revolution at the end of every month from the snail-cam $D^2$, before mentioned, on the arbor D, through the agency of a lever, M, (shown in Figs. 1, 2, and 3,) a rod *p*, (shown in Figs. 1 and 5,) and a lever, N, click P, and wheel Q, (shown in Fig. 5,) said wheel having twelve teeth and being secured to the roller C, and the lever N being fitted to work on the shaft *q* of said roller, close to said wheel, and having the click P suspended from it by a pin, S, in such a manner that, as the said click rises with the said lever it will slide over the teeth of the wheel Q, but that as it descends with said lever it will engage between the teeth of and move the said wheel, and with it the roller C. The lever M works on a fulcrum in one of the posts A′, and is furnished with a rigid downwardly-projecting leg, M′, which rests upon the cam D′, and it is connected by the rod *p* with the click-lever N. The cam, by its revolution, raises the lever M, and with it the lever N and the pawl, and when the abrupt step of the cam passes the end of the arm M′ at midnight the levers drop, and the click moves the wheel Q suddenly. The roller C is prevented from moving too far by a detent, R, which is raised to permit the necessary movement of the wheel Q by a projection, *r*, on the lewer N, and let fall again between the teeth as the lever descends; and the said wheel is prevented from being turned backward by a pawl, S, which is raised by the action of the teeth themselves in turning the right way.

The day-of-the-week roller is operated by a lever, N′, and click P′, (see Fig. 2,) applied substantially like N and P, to operate on a toothed wheel, Q′, secured on its shaft *q*′, said lever being operated by a rod, *t*, which is operated upon every day by the lever H in the same manner as the rod *a* before described, and the said wheel Q′ has a detent, R′, and a pawl, S′, like R and S, applied to it to prevent its moving too far at a time or turning back, said detent being raised, when the wheel is to be turned by a projection, *r*′, on the lever N′. The wheel Q′ has fourteen (14) teeth and the roller B has the days of two weeks inscribed upon it, and hence the said wheel completes its revolution once in two weeks. The reason for this is that with a wheel of seven (7) teeth which would be necessary if the roller only had the days of one week upon it, the click P′ could not be made to operate with the same degree of certainty.

We do not claim, broadly, the construction of the year-wheel K, nor the use of a quadrienially revolving wheel with four teeth representing the four months of February in a bissextile term, as this devices are represented in Letters Patent No. 15,637, applied and combined in a manner different from that described in this specification; but

What we claim, and desire to secure by Letters Patent, is—

1. The employment in a calendar-clock of a year-wheel, K, and a detached leap-year wheel, L, applied to rotate about separate fixed axes, and combined and operating together substantially as herein specified.

2. The combination of the year-wheel K, detached leap-year wheel L, detent J, and a day-of-the-month wheel, F, of the construction herein described, the whole operating together substantially as herein set forth.

W. T. HUNTINGTON.
HERVEY PLATTS.

Witnesses for W. T. Huntington:
M. M. LIVINGSTON,
J. F. BUCKLE.

Witnesses to signature of Hervey Platt:
J. W. SMITH,
JEBEZ B. SCOTT.